(12) United States Patent
Kimura et al.

(10) Patent No.: US 9,594,240 B2
(45) Date of Patent: Mar. 14, 2017

(54) LIGHTING APPARATUS, AND OPTICAL INSPECTION APPARATUS AND OPTICAL MICROSCOPE USING THE LIGHTING APPARATUS

(71) Applicant: SAMSUNG ELECTRONICS CO., LTD., Suwon-si, Gyeonggi-do (KR)

(72) Inventors: Nobuyuki Kimura, Kanagawa (JP); Mitsuhiro Togashi, Kanagawa (JP); Masaki Takada, Kanagawa (JP); Mitsunori Numata, Kanagawa (JP)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/559,337

(22) Filed: Dec. 3, 2014

(65) Prior Publication Data

US 2015/0160445 A1 Jun. 11, 2015

(30) Foreign Application Priority Data

Dec. 6, 2013 (JP) .................................. 2013-253528
May 23, 2014 (KR) ........................ 10-2014-0062589

(51) Int. Cl.
| | |
|---|---|
| *G02B 6/00* | (2006.01) |
| *G02B 21/06* | (2006.01) |
| *G02B 21/00* | (2006.01) |
| *G02B 21/08* | (2006.01) |
| *G02B 27/09* | (2006.01) |

(Continued)

(52) U.S. Cl.
CPC ......... *G02B 21/06* (2013.01); *G02B 21/0016* (2013.01); *G02B 21/082* (2013.01); *G02B 27/0994* (2013.01); *G02B 6/0008* (2013.01); *G02B 6/03694* (2013.01)

(58) Field of Classification Search
CPC ................................ G02B 21/06; G02B 21/36
USPC ......................................................... 385/140
See application file for complete search history.

(56) References Cited

U.S. PATENT DOCUMENTS

| | | | | |
|---|---|---|---|---|
| 4,576,436 A | * | 3/1986 | Daniel ...................... | F21S 8/04 |
| | | | | 359/591 |
| 4,952,058 A | * | 8/1990 | Noguchi ................ | G01N 21/94 |
| | | | | 356/237.5 |

(Continued)

FOREIGN PATENT DOCUMENTS

| | | |
|---|---|---|
| EP | 1 635 207 A2 | 3/2006 |
| EP | 1 798 758 B1 | 12/2009 |

(Continued)

*Primary Examiner* — Kaveh C Kianni
(74) *Attorney, Agent, or Firm* — Lee & Morse, P.C.

(57) ABSTRACT

Provided are a lighting apparatus, and an optical inspection apparatus and an optical microscope using the lighting apparatus. The lighting apparatus includes a light source that emits light, an optical device that outputs light that is more uniformly intense over a predetermined ray angle distribution than light input thereto; a multi-reflection device that reflects light multiple times, the multi-reflection device having a light incident surface receiving light and a light emission surface that emits multiply reflected light, and a light diffusion device that diffuses the light emitted from the light emission surface of the multi-reflection device. The light source, the optical device, the multi-reflection device, and light diffusion device share an optical path.

19 Claims, 10 Drawing Sheets

(51) Int. Cl.
*F21V 8/00* (2006.01)
*G02B 6/036* (2006.01)

(56) References Cited

U.S. PATENT DOCUMENTS

| | | | | |
|---|---|---|---|---|
| 5,751,388 | A * | 5/1998 | Larson | G02B 3/005 349/87 |
| 6,050,689 | A * | 4/2000 | Nakamura | G02B 27/0961 348/E9.027 |
| 6,665,052 | B2 | 12/2003 | Sato | |
| 7,161,671 | B2 * | 1/2007 | Shibata | G01N 21/95607 250/559.42 |
| 7,443,578 | B2 | 10/2008 | Yamazaki et al. | |
| 7,800,821 | B2 | 9/2010 | Yamazaki et al. | |
| 2004/0047579 | A1 * | 3/2004 | Iwasaki | G02B 6/4298 385/129 |
| 2004/0062044 | A1 * | 4/2004 | Hanano | G02B 27/0927 362/317 |
| 2004/0174595 | A1 * | 9/2004 | Koide | G02B 27/283 359/489.07 |
| 2004/0223121 | A1 * | 11/2004 | Koide | G02B 27/0927 353/30 |
| 2005/0099824 | A1 * | 5/2005 | Dowling | A61B 1/0653 362/572 |
| 2006/0056021 | A1 * | 3/2006 | Yeo | G02B 5/0242 359/460 |
| 2006/0099714 | A1 * | 5/2006 | Mata | A61K 31/355 436/106 |
| 2008/0030707 | A1 | 2/2008 | Tanaka et al. | |
| 2008/0123052 | A1 * | 5/2008 | Su | A61B 3/12 351/221 |
| 2008/0165401 | A1 * | 7/2008 | Kasazumi | G02B 27/48 359/196.1 |
| 2010/0253769 | A1 * | 10/2010 | Coppeta | G02B 27/1026 348/58 |
| 2010/0288614 | A1 * | 11/2010 | Ender | G02B 6/0065 200/5 A |
| 2013/0242606 | A1 * | 9/2013 | Kurashige | G02B 6/0023 362/609 |
| 2014/0009902 | A1 * | 1/2014 | Banin | G02F 1/133617 362/19 |

FOREIGN PATENT DOCUMENTS

| | | |
|---|---|---|
| EP | 1 750 154 B1 | 9/2011 |
| JP | 09-022869 A | 1/1997 |
| JP | 11-312639 A | 11/1999 |
| JP | 2007-033790 A | 2/2007 |
| JP | 2010-261948 A | 11/2010 |
| WO | WO 2005-026843 A2 | 3/2005 |

* cited by examiner

LIGHTING APPARATUS, AND OPTICAL INSPECTION APPARATUS AND OPTICAL MICROSCOPE USING THE LIGHTING APPARATUS

CROSS-REFERENCE TO RELATED APPLICATIONS

Japanese Patent Application No. 2013-253528, filed on Dec. 6, 2013, in the Japan Patent Office, and Korean Patent Application No. 10-2014-0062589, filed on May 23, 2014, in the Korean Intellectual Property Office, and entitled: "Lighting Apparatus, and Optical Inspection Apparatus and Optical Microscope Using the Lighting Apparatus" are incorporated by reference herein in their entirety.

BACKGROUND

1. Field

Embodiments relate to a lighting apparatus, an optical inspection apparatus, and an optical microscope, and more particularly, to a lighting apparatus, an optical inspection apparatus, and an optical microscope that may adjust a light intensity distribution to be uniform.

2. Description of the Related Art

An optical inspection apparatus is generally used to inspect a semiconductor wafer. The optical inspection apparatus emits illumination light to the semiconductor wafer to be inspected, captures an image by using light reflected from a surface of the semiconductor wafer, and inspects where there is a defect in the image. Also, an optical microscope emits illumination light to an object to be observed and captures an image by using transmitted light or reflected light.

SUMMARY

One or more embodiments is directed to providing a lighting apparatus, including a light source that emits light, an optical device that outputs light that is more uniformly intense over a predetermined ray angle distribution than light input thereto, the optical device being in a light path of the light source, a multi-reflection device that reflects light multiple times, the multi-reflection device having a light incident surface that receives light and a light emission surface that emits multiply-reflected light, the multi-reflection device being in a light path of the light source, and a light diffusion device that diffuses light emitted from the light emission surface of the multi-reflection device. The elements of the lighting source share an optical path.

The optical device may include a plurality of concentric transmissive regions, adjacent transmissive regions having different transmittances.

Each of the transmissive regions may have different transmittances from one another.

The optical device may include a first transmissive region at a center, a second transmissive region at an intermediate ring, and a third transmissive region at an outermost ring, wherein a third transmittance of the third transmissive region is higher than a second transmittance of the second transmissive region.

The third transmittance may be higher than a first transmittance of the first transmissive region.

The optical device may include concentric transmissive regions having transmittances that continuously change in a radial direction.

The transmissive regions may include a central transmissive region formed at a center and having a central transmittance, an outer transmissive region at outermost ring and has an outer transmittance, and an intermediate transmissive region between the central transmissive region and the outer transmissive region and has an intermediate transmittance, wherein the outer transmittance is higher than the intermediate transmittance.

The optical device may be between the light source and the multi-reflection device.

The optical device may be between the light diffusion device and an object to be illuminated.

The lighting apparatus may include a light focusing optical system adjacent to an object to be illuminated, wherein the optical device is axially aligned with an objective lens of the light focusing optical system.

The lighting apparatus may include a plurality of the optical devices.

The light source may be a point light source, and the lighting apparatus may further include a reflector that reflects the light emitted from the light source and focuses the reflected light onto the light incident surface of the multi-reflection device.

The light source may be a laser-produced plasma (LPP) light source or a laser-driven light source (LDLS).

An area of a spot of the light focused on the light incident surface of the multi-reflection device may be less than an area of the light incident surface.

One or more embodiments is directed to providing an optical inspection apparatus, including a light source that emits light, an optical device that outputs light that is more uniformly intense over a predetermined ray angle distribution than light input thereto, the optical device being in a light path of the light source, a multi-reflection device that reflects light multiple times, the multi-reflection device having a light incident surface receiving the light and a light emission surface that emits multiply-reflected light, the multi-reflection device being in a light path of the light source, a light diffusion device that diffuses light emitted from the light emission surface of the multi-reflection device, an image pickup apparatus, and an optical path conversion device that transmits the diffused light to be projected onto an object to be inspected and reflects light reflected from the object to the image pickup apparatus.

One or more embodiments is directed to providing a lighting apparatus, including a light source that emits light, an optical device that outputs light that is more uniformly intense over a predetermined ray angle distribution than light input thereto, the optical device being in a light path of the light source, an optical integrator having an input surface and an output surface, wherein light is focused onto the input surface, the optical integrator being in a light path of the light source, and a diffuser that diffuses light output from the optical integrator.

The optical device may be designed in accordance with a ray angle distribution of the light from the light source and the predetermined ray angle distribution.

The optical device may be between the light source and the optical integrator.

The optical device may be downstream of the diffuser.

The predetermined ray angle distribution may be annular.

One or more embodiments is directed to providing an optical microscope including the lighting apparatus.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
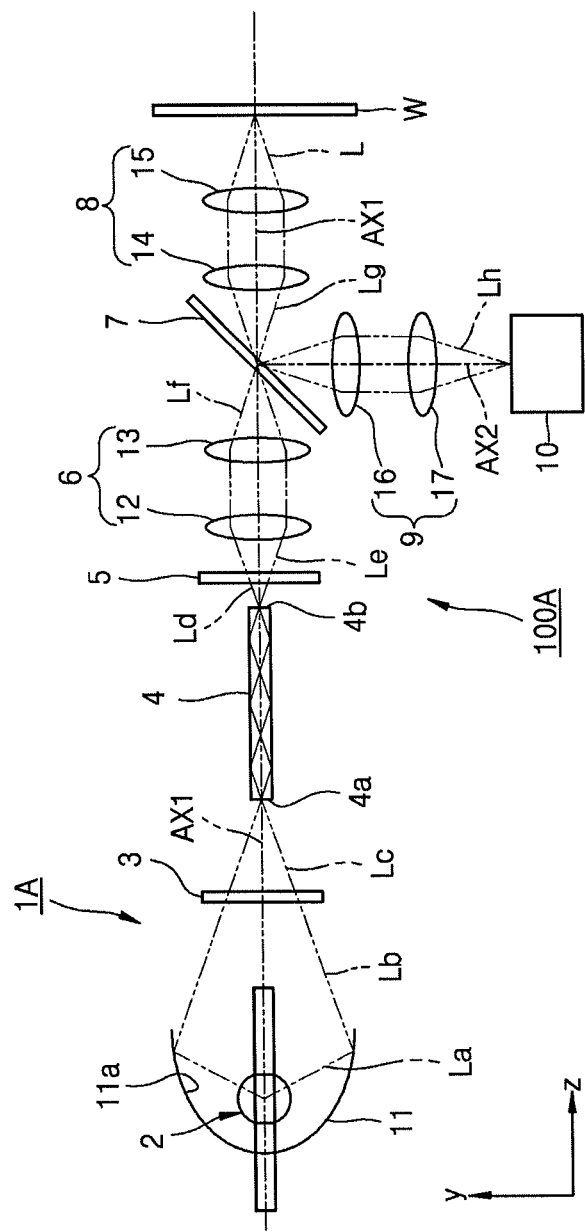
FIG. 1 illustrates a plan view of elements of a lighting apparatus and an optical inspection apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first", "second", "third", etc. may be used herein to describe various members, regions, layers, portions, and/or elements, these members, regions, layers, portions/and/or elements should not be limited by these terms. These terms are only used to distinguish one member, region, layer, portion, or element from another member, region, layer, portion, or element. Thus, a first member, region, layer, portion, or element discussed below could be termed a second member, region, layer, portion, or element without departing from the teachings of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As such, variations from the shapes of the illustrations as a result, for example, of manufacturing techniques and/or tolerances, are to be expected. Thus, exemplary embodiments should not be construed as limited to the particular shapes of regions illustrated herein but may be to include deviations in shapes that result, for example, from manufacturing.

In the drawings, sizes of elements may be exaggerated for clarity.

FIG. 1 illustrates a plan view of a lighting apparatus 1A and an optical inspection apparatus 100A according to an embodiment.

Referring to FIG. 1, the optical inspection apparatus 100A inspects whether there is a defect in a target, e.g., a semiconductor wafer (hereinafter, referred to as a wafer) W, to be inspected. In detail, the optical inspection apparatus 100A includes the lighting apparatus 1A, an image forming optical system 9, and an image pickup apparatus 10. The lighting apparatus 1A may include a light source 2, an optical device 3, a multi-reflection device 4, a light diffusion device 5, a relay optical system 6, an optical path conversion device 7, and a light focusing optical system 8. The lighting apparatus 1A forms an illumination optical system that supplies illumination light L to the wafer W.

From among the elements, the light source 2, the optical device 3, the multi-reflection device 4, the light diffusion device 5, the relay optical system 6, the optical path conversion device 7, and the light focusing optical system 8 are sequentially arranged in parallel to have a first optical axis AX1 as a common axis, i.e., are axially aligned along a z-axis. The optical path conversion device 7, the image forming optical system 9, and the image pickup apparatus 10 are sequentially arranged in parallel to have a second optical axis AX2, different from the first optical axis AX1, as a common axis. In some embodiments, the second optical axis AX2 and the first optical axis AX1 may orthogonally intersect each other, i.e., the second optical axis may be along a y-axis.

The light source 2 radially emits first light La from a light emission point. In some embodiments, the light source 2 may be a point light source. For example, in order to improve detection sensitivity, a point light source of which a light emission point is small, e.g., a laser-produced plasma (LPP) light source or a laser-driven light source (LDLS), may be used as the light source 2. When the lighting apparatus 1A includes a point light source, the detection sensitivity of the optical inspection apparatus 100A may be improved.

A reflector 11 is disposed around the light source 2. The reflector 11 has an inner reflective surface 11a having a parabolic cross-sectional shape. The inner reflective surface 11a reflects the first light La emitted from the light source 2 and causes second light Lb to be focused on a light incident surface 4a of the multi-reflection device 4 as will be described below.

The optical device 3 is disposed between the light source 2 and the multi-reflection device 4. The optical device 3 changes a ray angle distribution of the second light Lb that travels from the light source 2 toward the multi-reflection device 4. In this case, the optical device 3 may have a plurality of transmissive regions having different transmittances, which will be explained below in detail with reference to FIGS. 2A and 2B.

The optical inspection apparatus 100A adjusts parameters, e.g., intensity, a ray angle distribution, a wavelength, and a polarization direction, of light supplied to a surface of the wafer W in order to improve detection sensitivity at which a defect in the wafer W is detected. Since various circuit patterns exist on the wafer W, there are optimal parameters for each wafer. In particular, from among the various circuit patterns, there are many circuit patterns for which defect detection sensitivity is improved by adjusting a ray angle distribution or a light intensity distribution of illumination light incident on the wafer W to be uniform. Accordingly, a ray angle distribution may be adjusted or a light intensity distribution of illumination light incident on the wafer W may be made uniform. Also, a ray angle distribution may be adjusted or a light intensity distribution may be uniform over an entirety of an object to be illuminated in order to capture an image of an object to be observed by using an optical microscope with no error. However, since a ray angle distribution may be expressed using a light intensity distribution of illumination light, the following will focus on a parameter regarding a light intensity.

In general, a light intensity distribution of illumination light is not uniform due to various factors. As used herein, uniformity is to mean substantially a same intensity over a predetermined ray angle distribution. For example, some systems may use all ray angles available, e.g., a circle, to illuminate a target. Other systems may use different predetermined ray angle distributions, e.g., an annulus, a quadropole, a dipole, and so forth.

Figure 2A:
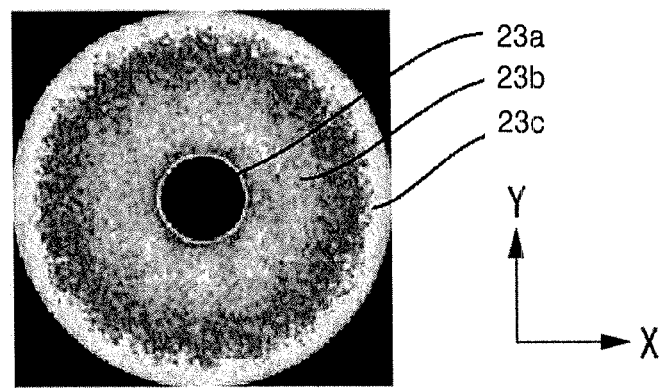
FIGS. 2(A) and 2(B) illustrate respectively a cross-sectional image and a graph illustrating a light intensity distribution of general illumination light.
Figure 2B:
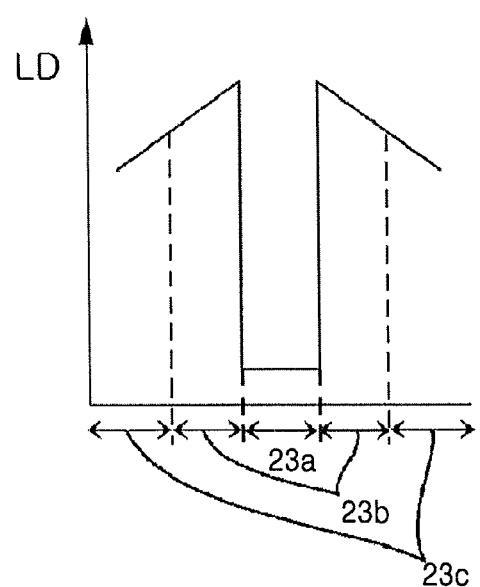

FIGS. 2(A) and 2(B) are respectively a cross-sectional image and a graph illustrating a light intensity distribution LD of illumination light when a super high pressure mercury lamp is used as a light source. FIG. 2 illustrates a light intensity distribution LD of illumination light on a pupil plane at the wafer W when neither the optical device 3 nor the diffuser 5 of FIG. 1 is present.

Referring to FIGS. 2(A) and 2(B), a light intensity distribution LD of illumination light emitted to the wafer W on the pupil plane is non-uniform according to a ray angle distribution of the illumination light. That is, a central portion 23a of the illumination light has a lowest light intensity due to a shadow of a valve of the super high pressure mercury lamp, an intermediate portion 23b escaping the shadow has a highest light intensity, and a light intensity gradually decreases away from the intermediate portion 23b toward an outer portion 23c.

Figure 3A:
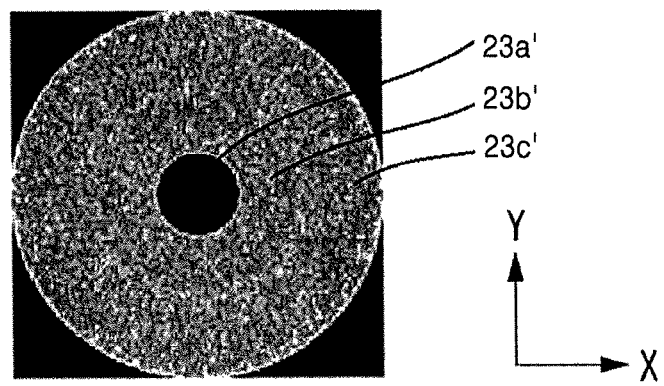
FIGS. 3(A) and 3(B) illustrate respectively a cross-sectional image and a graph illustrating a light intensity distribution of illumination light that has passed through a digital micromirror device (DMD)
Figure 3B:
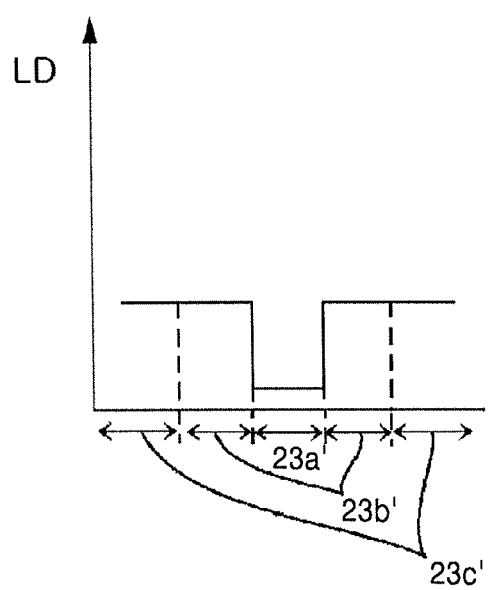

In order to solve the non-uniform light intensity distribution of the illumination light, some devices are included in a lighting apparatus. However, there is a limitation in generating excellent illumination light with parameters that affect the quality of the lighting apparatus in general. FIGS. 3(A) and 3(B) are respectively a cross-sectional image and a graph illustrating a light intensity distribution LD of illumination light that has passed through a digital micromirror device (DMD). Since the DMD changes a ray angle distribution of illumination light by allowing tilt angles of a plurality of mirrors to be changed as a driving voltage is applied or not, the DMD may be used to make a ray angle distribution or a light intensity distribution of illumination light uniform.

However, when the DMD is used, a light intensity distribution LD of illumination light on a pupil plane has a central portion $23a'$ with a low light intensity and an intermediate portion $23b'$ and an outer portion $23c'$ have uniform light intensities across each band thereof, e.g., substantially zero in the central portion $23a$ and substantially uniform over the intermediate portion $23b$ and the outer portion $23c$. However, since reflectances of mirrors are low, overall light intensities are low. Since a light intensity of illumination light is a parameter necessary to inspect all semiconductor patterns, sufficient light intensity when the wafer W is inspected. Accordingly, when the DMD is used, although a light intensity distribution LD of illumination light may be made uniform, it is difficult to secure a light intensity that is high enough to improve detection sensitivity.

Accordingly, the optical device 3 that may obtain a uniform light intensity distribution while securing a sufficient light intensity according to embodiments will be explained with reference to FIGS. 4 and 5. The optical devices in FIGS. 4 and 5 may be designed in accordance with an output of the light source 2 and mirror 11 and with a predetermined ray angle distribution to be provided to the wafer W.

Figure 4A:
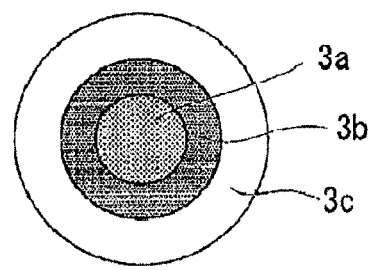
FIGS. 4(A) and 4(B) illustrate respectively a cross-sectional view and a graph illustrating transmissive regions of an optical device and transmittances of the transmissive regions, according to an embodiment.
Figure 4B:
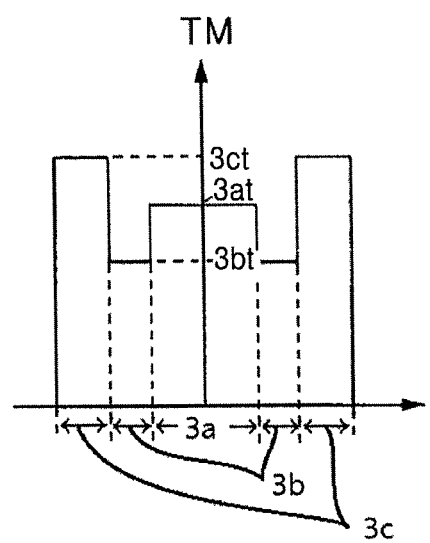

FIGS. 4(A) and 4(B) are respectively a cross-sectional view illustrating transmissive regions of the optical device 3 on a pupil plane and a graph illustrating transmittances TM of the transmissive regions, according to an embodiment.

Referring to FIG. 4(A), three transmissive regions of which transmittances gradually change in a concentric direction are formed on a pupil plane of the optical device 3 of FIG. 1.

The three transmissive regions may be a first transmissive region 3a at a center, a second transmissive region 3b that surrounds the first transmissive region 3a, and a third transmissive region 3c that is formed outermost. The first transmissive region 3a has a first transmittance 3at, the second transmissive region 3b has a second transmittance 3bt, and the third transmissive region 3c has a third transmittance 3ct.

In some embodiments, the first transmittance 3at, the second transmittance 3bt, and the third transmittance 3ct may be all different. In some embodiments, transmissive regions that are separated from each other from among the transmissive regions of the optical device 3 may have the same transmittance, e.g., the first transmittance 3at and the third transmittance 3ct may be the same.

Although three transmissive regions are illustrated in FIG. 4A, the present embodiment is not limited thereto. In some embodiments, since a plurality of transmissive regions having different transmittances in the concentric direction may be formed on the pupil plane of the optical device 3, the number of the transmissive regions may be 2 or more.

Adjacent transmissive regions from among the plurality of transmissive regions have different transmittances. However, the plurality of transmissive regions may not all have different transmittances. In some embodiments, transmissive regions that are separated from each other from among the plurality of transmissive regions of the optical device 3 may have the same transmittance, such that there is a boundary formed by the transmittances defining the plurality of transmissive regions.

Referring to the graph of FIG. 4(B), the first transmittance 3at, the second transmittance 3bt, and the third transmittance 3ct of the first through third transmissive regions 3a, 3b, and 3c are all different.

The first transmittance 3at and the third transmittance 3ct may be greater than the second transmittance 3bt, in consideration of a case where a light intensity of light incident on the second transmissive region 3b is higher than that of light incident on the first transmissive region 3a and the third transmissive region 3c. That is, in order to make a light intensity of light passing through the first transmissive region 3a and the third transmissive region 3c and a light intensity of light passing through the second transmissive region 3b uniform, the second transmissive region 3b is adjusted to have a low transmittance.

Alternatively, the first transmittance 3at of the first transmissive region 3a that is formed at the center may be lower than the third transmittance 3ct of the third transmissive region 3c at the outermost ring, in consideration of a case where a light intensity of light passing through the first transmissive region 3a, other than a portion of which light intensity is reduced due to a shadow of a point light source, is higher than that of light passing through the third transmissive region 3c. Accordingly, a light intensity of light passing through the first transmissive region 3a and a light intensity of light passing through the third transmissive region 3c may be made uniform.

Figure 5A:
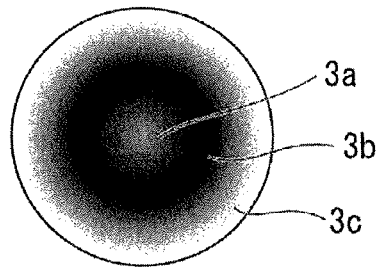
FIGS. 5(A), 5(B), and 5(C) illustrate, respectively, a cross-sectional view and graphs illustrating transmissive regions of the optical device and transmittances of the transmissive regions, according to other embodiment.
Figure 5B:
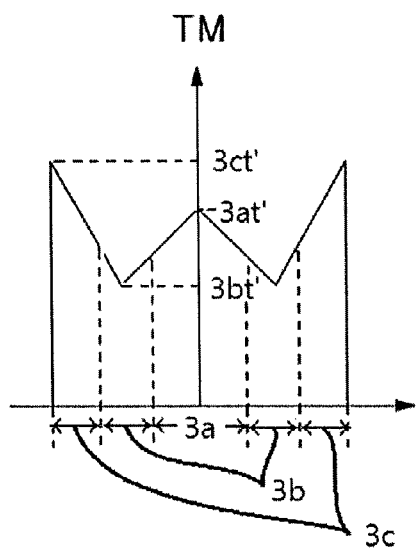
Figure 5C:
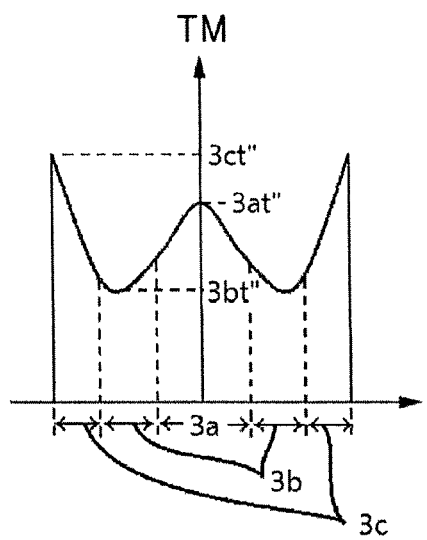

FIGS. 5(A), 5(B), and 5(C) are respectively a cross-sectional view illustrating a transmissive region of the optical device 3 and graphs illustrating transmittances TM of the transmissive region, according to other embodiments. Results of FIGS. 5(A), 5(B), and 5(C) are similar to those of FIGS. 4(A) and 4(B) in terms of a changing pattern of a transmissive region, but are different from those of FIGS. 4(A) and 4(B) in that a transmittance of a transmissive region is adjusted to be continuously changed.

Referring to FIG. 5(A), transmissive regions of which transmittances continuously change in a concentric direction are formed in a plane of the optical device 3 of FIG. 1. The transmissive regions have transmittances that continuously change, and the following will be explained for convenience on the assumption that the transmissive regions are three transmissive regions. That is, a transmissive region at a center is referred to as the first transmissive region 3a, a transmissive region that contacts the first transmissive region 3a is referred to as the second transmissive region 3b, and a transmissive region outermost is referred to as the third transmissive region 3c.

Referring to FIG. 5(B), a central portion of the first transmissive region 3a of FIG. 5(A) has a first transmittance 3at', a central portion of the second transmissive region 3b in a diameter direction of FIG. 5(A) has a second transmittance 3bt', and an outermost portion of the third transmissive region 3c of FIG. 5(A) has a third transmittance 3ct'. In this case, the first transmittance 3at' and the third transmittance 3ct' may be higher than the second transmittance 3bt'. Each transmittance may continuously change. As described with reference to FIGS. 4(A) and 4(B), in consideration of a case where a light intensity of light incident on the second transmissive region 3b is higher than that of light incident on the first transmissive region 3a and the third transmissive region 3c, transmittances are adjusted to secure a uniform light intensity distribution over the first through third transmissive regions 3a, 3b, and 3c.

Also, the first transmittance 3at' may be lower than the third transmittance 3ct', in consideration of a case where a light intensity is greatly reduced because location is far from a point light source. Accordingly, a light intensity of light passing through the first transmissive region 3a and a light intensity of light passing through the third transmissive region 3c may be made uniform.

Although a change rate from the first transmittance 3at' to the second transmittance 3bt' and a change rate from the second transmittance 3bt' to the third transmittance 3ct' are constant and there is a sharp change in a transmittance around the central portion of the second transmissive region 3b having the second transmittance 3bt' in FIG. 5(B), the present embodiment is not limited thereto.

As shown in FIG. 5(C), a change rate from a first transmittance 3at'' to a second transmittance 3bt'' and a change rate from the second transmittance 3bt'' to a third transmittance 3ct'' may not be constant, and a change rate in a transmittance around the central portion of the second transmissive region 3b having the second transmittance 3bt'' may be continuous.

In some embodiments, the first transmittance 3at'' and the third transmittance 3ct'' are set to be higher than the second transmittance 3bt'', in consideration of such a change tendency in a transmittance. That is, although there exist tiny fluctuations in each of the first transmittance 3at'', the second transmittance 3bt'', and the third transmittance 3ct'', an average of the first transmittance 3at'' and an average of the third transmittance 3ct'' are set to be higher than an average of the second transmittance 3bt''.

Although transmittances of the first transmissive region 3a and the third transmissive region 3c on the pupil plane of the optical device 3 are set to be higher than that of the second transmissive region 3b in FIGS. 4(A) through 5(C), embodiments are not limited thereto. When a plurality of transmissive regions having different transmittances are set on the pupil plane of the optical device 3, a uniform light intensity distribution over the entire optical device 3. Accordingly, transmittances may be freely adjusted. That is, the number of transmissive regions, a shape of the transmissive regions, and transmittances may be appropriately adjusted in consideration of characteristics of the point light source, a shape of a reflector, a predetermined ray angle distribution to be incident on the wafer W, and so forth.

In some embodiments, the lighting apparatus 1A or the optical inspection apparatus 100A may include a plurality of the optical devices 3.

Figure 6A:
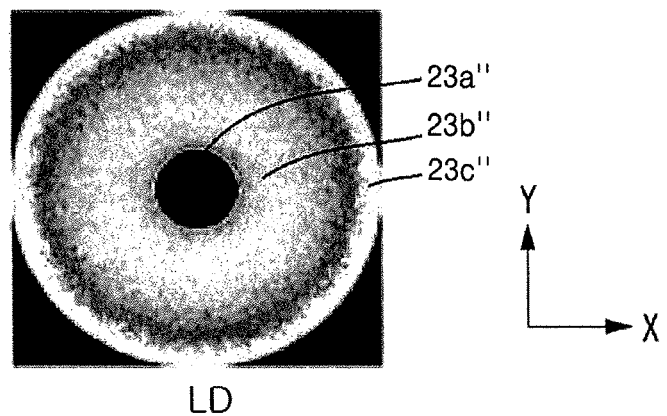
FIGS. 6(A) and 6(B) illustrate respectively a cross-sectional image and a graph illustrating a light intensity distribution of illumination light of the lighting apparatus of FIG. 1 from which the optical device is omitted.
Figure 6B:
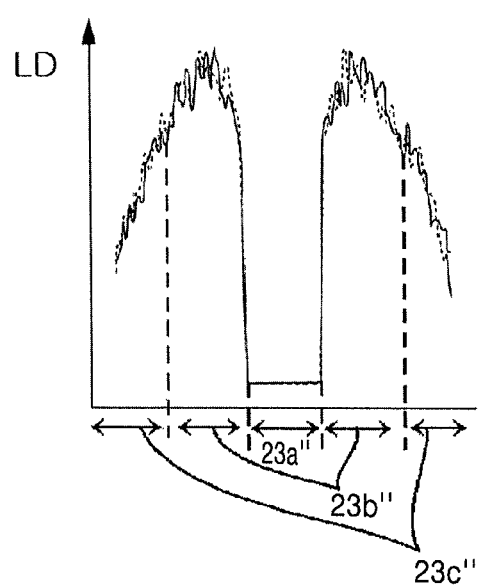

FIGS. 6(A) and 6(B) are respectively a cross-sectional image and a graph illustrating a light intensity distribution LD of illumination light of the lighting apparatus 1A of FIG. 1 from which the optical device 3 is omitted.

A light intensity distribution LD of illumination light on a pupil plane of FIGS. 6(A) and 6(B) is obtained after light that is emitted from the multi-reflection device 4 is diffused by the light diffusion device 5. The light Ld that is emitted from the multi-reflection device 4 may have a light intensity distribution that periodically increases and decreases due to repeated interference of reflected light, i.e., an interference pattern. However, such an interference pattern is compensated by the light diffusion device 5, which will be explained below with reference to FIGS. 1, 8, and 9, such that this interference pattern is not transmitted to the wafer W.

Even when such an interference pattern is not transmitted, the diffuser 5 only softens the effect somewhat, such that a light intensity distribution LD of illumination light on the pupil plane has a second portion 23b'' between a first portion 23a'' at a center and a third portion 23c outermost has a high light intensity and the third portion 23c has a light intensity that is lower than that of the first portion 23a'', as shown in FIGS. 6(A) and 6(B). As such, when there is no device for adjusting a light intensity distribution, illumination light still has a non-uniform light intensity distribution.

Figure 7A:
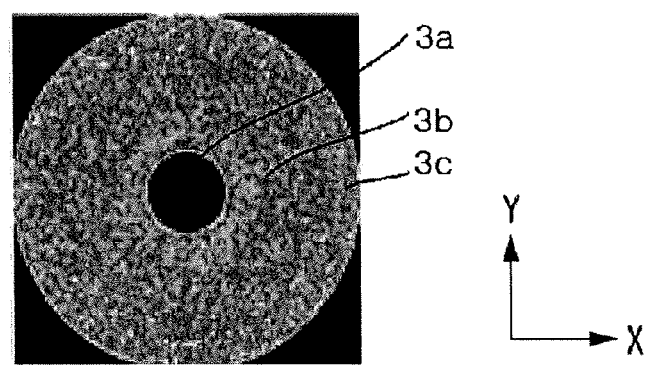
FIGS. 7(A) and 7(B) illustrate respectively a cross-sectional image and a graph illustrating a light intensity distribution of the lighting apparatus including an optical device, according to an embodiment.
Figure 7B:
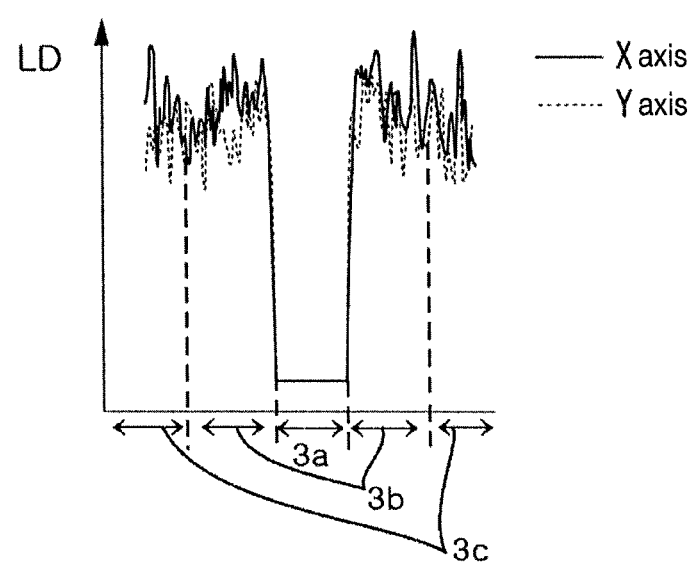

FIGS. 7(A) and 7(B) are respectively a cross-sectional image and a graph illustrating a light intensity distribution LD of the lighting apparatus 1A employing the optical device 3 without the light diffusion device 5, according to an embodiment. That is, FIGS. 7(A) and 7(B) are respectively a cross-sectional image and a graph illustrating a light intensity distribution LD of the lighting apparatus 1A employing the optical device 3 of FIGS. 4 and 5, unlike a non-uniform light intensity distribution LD of the lighting apparatus 1A not employing the optical device 3 of FIGS. 6(A) and 6(B).

Referring to FIG. 7(A), when the lighting apparatus 1A uses the optical device 3 and the light diffusion device 5, a light intensity distribution LD of illumination light L on the pupil plane light loss may be suppressed as shown in FIGS. 6(A) and 6(B) and light intensities at a central portion, an intermediate portion, and an outer portion may be further made uniform.

FIG. 7(B) is a graph illustrating a light intensity distribution LD along an X-axis (a horizontal axis) and a Y-axis (a vertical axis) that pass a center of the light intensity distribution LD on the pupil plane of FIG. 6(A), in consideration of a case where light intensities at the first transmissive region 3a and the third transmissive region 3c in a concentric direction are low and a light intensity at the second transmissive region 3b is high as described with reference to FIGS. 6(A) and 6(B). That is, the illumination light L having passed through the optical device 3 may output light having a uniform light intensity distribution over predetermined ray angles by adjusting the second transmittance $3bt$ of the second transmissive region $3b$ of FIG. 4(A) through 5(C) to be lower than that of the third transmissive region $3a$.

However, examining FIG. 7(B), there are fluctuations in a light intensity because of an interference pattern that is generated due to the multi-reflection device 4. However, the light diffusion device 5 prevents the interference pattern from being incident on the wafer W, as will be described below, these fluctuations are further decreased. Although a light intensity distribution may not be completely uniform due to such fluctuations in a light intensity, the light intensity distribution is more uniform over the second and third regions. Thus, a better effect may be obtained than when the optical device 3 is not used as described with reference to FIGS. 6(A) and 6(B).

Referring back to FIG. 1, the light source 2 and the optical device 3 have been explained, and the multi-reflection device 4 will now be explained. The multi-reflection device 4 uses a repeated phenomenon where light reflected from a surface is reflected from the opposite surface. The lighting apparatus 1A using a point light source may reduce light loss by using the multi-reflection device 4.

The multi-reflection device 4 of FIG. 1 has a light incident surface 4a at a first end of the multi-reflection device 4 in a longitudinal direction, e.g., along the x-axis and the y-axis, and a light emission surface 4b at a second end of the multi-reflection device 4 in the longitudinal direction, and spaced from the light incident surface 4a along the z-axis. The multi-reflection device 4 allows third light Lc that has passed through the optical device 3 to be incident on the light incident surface 4a, to be reflected in the multi-reflection device 4 multiple times, e.g., by total internal reflection, and to be emitted as fourth light Ld from the light emission surface 4b. In some embodiments, the multi-reflection device 4 may include a rod integrator.

However, the multi-reflection device 4 has a problem that since the reflected light interferes with one another, an interference pattern is generated as a light intensity distribution periodically increases or reduces. Thus, a uniform light intensity distribution may not be obtained.

Figure 8A:
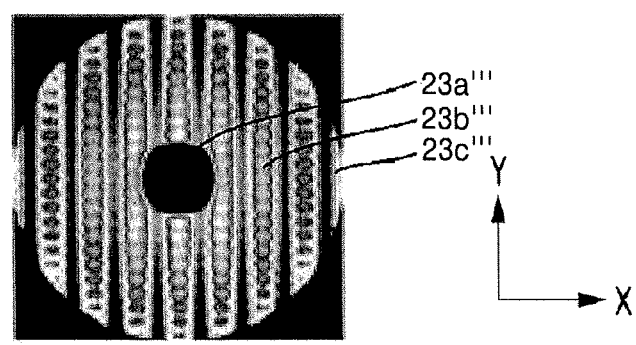
FIGS. 8(A) and 8(B) illustrate respectively a cross-sectional image and a graph illustrating a light intensity distribution of illumination light of a general lighting apparatus.
Figure 8B:
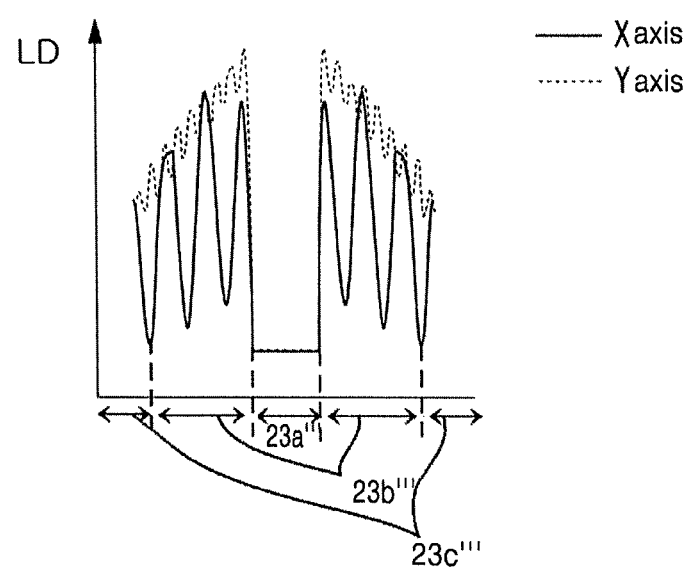

FIGS. 8(A) and 8(B) are respectively a cross-sectional image and a graph illustrating a light intensity distribution LD of illumination light on a pupil plane of a general lighting apparatus using the point light source 2 and the multi-reflection device 4, without either the diffuser 5 or optical device 3.

When the general lighting apparatus uses a point light source as a light source, a spot size of light focused on a light incident surface of the multi-reflection device may be sufficiently smaller than that of the light incident surface. In this case, reflected light interferes with one another, generating an interference pattern.

Referring to FIGS. 8(A) and 8(B), a light intensity distribution LD of illumination light on a pupil plane has light intensities that are sequentially reduced and made non-uniform from the first portion $23a'''$ to the third portion $23c'''$. In addition, a light intensity distribution periodically increases or reduces due to multiple reflections.

FIG. 8(B) is a graph illustrating a light intensity distribution LD along an X-axis (a horizontal axis) and a Y-axis (a vertical axis) that pass through a center of the light intensity distribution LD on the pupil plane of FIG. 8(A).

Figure 9:
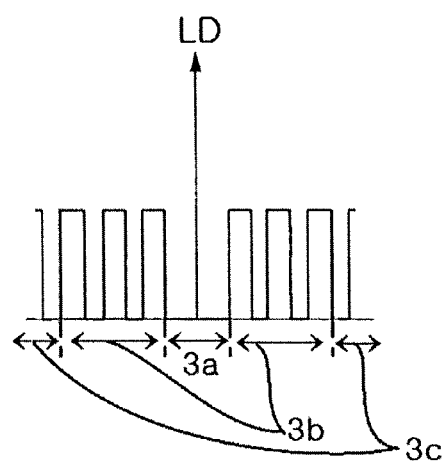
FIG. 9 illustrates a graph illustrating a light intensity distribution of illumination light of the general lighting apparatus of FIGS. 8(A) and 8(B) including an optical device.

FIG. 9 is a graph illustrating a light intensity distribution LD along an X-axis (a horizontal axis) when a transmittance of illumination light is changed by using the optical device 3 of FIG. 4(A) through 5(C) in the general lighting apparatus of FIGS. 8A and 8B.

Referring to FIG. 9, when the optical device 3 is employed, although each of light intensities which are periodically changed may be made uniform at the second transmissive region 3b, and the third transmissive region 3c, an interference pattern is still generated by the multi-reflection device 4.

As such, when the general lighting apparatus uses a point light source as the light source 2 and uses the multi-reflection device 4, it is necessary to prevent an interference pattern from being supplied as the illumination light L. Accordingly, according to an embodiment, an optical device is employed to make a light intensity distribution uniform and the light diffusion device 5 is employed to prevent an interference pattern from apparent in the illumination light L.

Referring back to FIG. 1, the light diffusion device 5 diffuses the fourth light LD emitted from the light emission surface 4b of the multi-reflection device 4.

Figure 10:
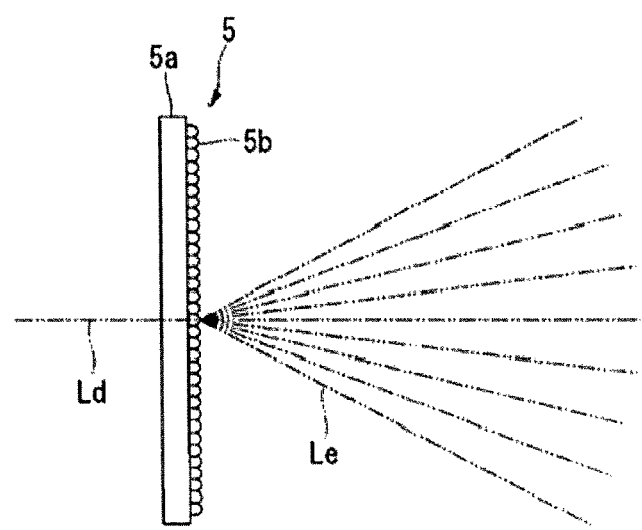
FIG. 10 illustrates a light diffusion device of FIG. 1, according to an embodiment.

FIG. 10 is a view illustrating the light diffusion device 5 of FIG. 1, according to an embodiment. Referring to FIG. 10, the light diffusion device 5 may include a fine uneven pattern 5b that is formed on one surface of a substrate 5a. The light diffusion device 5 is disposed such that a surface on which the uneven pattern 5b is formed is opposite to a surface facing the multi-reflection device 4. Accordingly, the light diffusion device 5 emits fifth light Le that is diffused by the uneven pattern 5b. The light diffusion device 5 may remove interference patterns of light beams that are generated as a plurality of pieces of reflected light generated by the multi-reflection device 4 interfere with one another. That is, the light diffusion device 5 may avoid a non-uniform light intensity distribution due to an interference pattern that may not be removed even by the optical device 3. As is evident from FIGS. 9 and 6, both the light diffusion device 5 and the optical device 3 aid in supplying uniform light illumination in a predetermined ray angle distribution to the wafer W. The relay optical system 6 includes a first relay lens 12 and a second relay lens 13 and adjusts a size of sixth light Lf in accordance with a size of an emission surface of the wafer W as shown in FIG. 1.

Although two lenses constitute the relay optical system 6 in FIG. 1, the present embodiment is not limited thereto. The relay optical system 6 may include 1 or more relay lenses.

The optical path conversion device 7, e.g., a beam splitter, may selectively transmit or reflect light. The optical path conversion device 7 transmits the sixth light Lf that travels toward the wafer W and reflects seventh light Lg that is reflected from the wafer W to the image forming optical system 9 and the image pickup apparatus 10. The optical path conversion device 7 may include a dichroic mirror-based device. Accordingly, light loss occurring when the sixth light Lf passes through the optical path conversion device 7 may be reduced. Also, since a light intensity of the seventh light Lg that is reflected from the wafer W may be increased or reduced by adjusting a thickness or a structure of a material of a dichroic mirror, a wavelength suitable for the image pickup apparatus 10 may be selected.

The light focusing optical system 8 includes a condenser lens 14 and an objective lens 15 and emits focused light, that is, illuminated light L, to the surface of the wafer W. That is, the sixth light Lf that has passed through the optical path conversion device 7 is focused by the condenser lens 14 and the objective lens 15 and the illumination light L is emitted to the surface of the wafer W. The seventh light Lg that has been reflected from the surface of the wafer W passes through the objective lens 15 and the condenser lens 14 and is incident on the optical path conversion device 7. Eighth light Lh that has been reflected from the optical path conversion device 7 travels toward the image forming optical system 9.

The image forming optical system 9 includes a light focusing lens 16 and an image forming lens 17 and forms the eighth light Lh as an image on an image pickup surface of the image pickup apparatus 10 in accordance with a size of the image pickup surface.

The image pickup apparatus 10 captures the image obtained by the eighth light Lg that is reflected from the surface of the wafer W. In some embodiments, the image pickup apparatus 10 may include a digital camera using an image pickup device such as a charge-coupled device (CCD) or a complementary metal-oxide semiconductor (CMOS) chip.

The optical inspection apparatus 100A may inspect whether there is a defect in the wafer W by using the image obtained by the image pickup apparatus 10. In the lighting apparatus 1A of FIG. 1, the optical device 3 changes a light intensity distribution by adjusting a ray angle distribution of the second light Lb that travels from the light source 2 toward the multi-reflection device 4. In addition, the light diffusion device 5 diffuses the fourth light Ld that is emitted from the light emission surface 4b of the multi-reflection device 4. Accordingly, even when a point light source of which a light emission point is small is used, more uniform illumination light L may be emitted to the wafer W. Since the optical inspection apparatus 100A may emit more uniform illumination light while suppressing light loss even when a point light source of which a light emission point is small is used by using the lighting apparatus 1A, detection sensitivity for the wafer W may be further improved.

Figure 11:
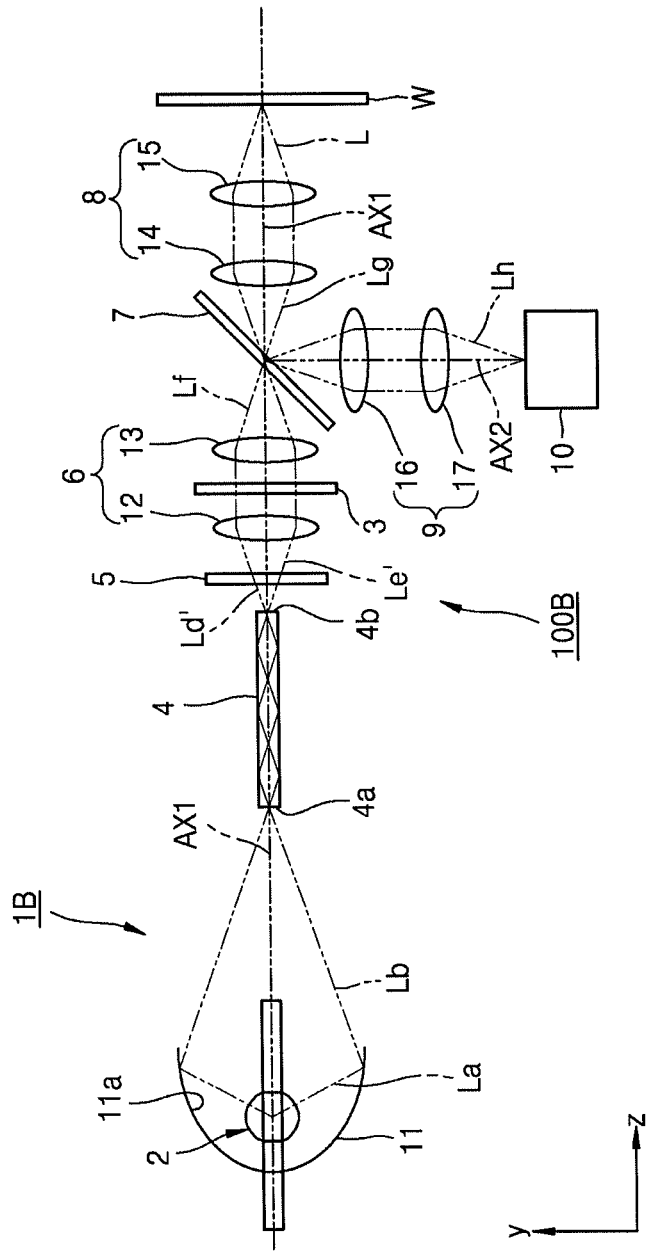
FIG. 11 illustrates a plan view of a lighting apparatus and an optical inspection apparatus according to another embodiment.

FIG. 11 is a plan view illustrating elements of a lighting apparatus 1B and an optical inspection apparatus 100B according to another embodiment. The same elements as those of the lighting apparatus 1A and the optical inspection apparatus 100A will not be explained and will be denoted by the same reference numerals.

The lighting apparatus 1B and the optical inspection apparatus 100B of FIG. 11 are basically the same as the lighting apparatus 1A and the optical inspection apparatus 100A of FIG. 1, respectively, except for a position of the optical device 3. That is, the optical device 3 is disposed between the light source 2 and the multi-reflection device 4 of the lighting apparatus 1A of FIG. 1, whereas the optical device 3 is disposed to share a common axis with the objective lens 15 that is the closest to the wafer W of the lighting apparatus 1B of FIG. 11.

In the lighting apparatus 1B, the light diffusion device 5 diffuses fourth light Ld' that is emitted from the light emission surface 4b of the multi-reflection device 4. Furthermore, the optical device 3 changes a ray angle distribution of fifth light Le' that has passed through the relay optical system 6. Accordingly, more uniform illumination light L may be emitted to the wafer W even when a point light source of which a light emission point is small is used. Additionally, another optical device 3 may be provided between the light source 2 and the multi-reflection device 4, as in FIG. 1.

Accordingly, since the optical inspection apparatus 100B of the present embodiment may emit more uniform illumination light while suppressing light loss even when a point light source of which a light emission point is small is used by using the lighting apparatus 1B, the detection sensitivity for the wafer W may be further improved.

For example, although the optical inspection apparatus 100A or 100B including the lighting apparatus 1A or 1B inspects the wafer W in the one or more embodiments, an object to be inspected is not limited as long as it may be inspected by the optical inspection apparatus 100A or 100B.

Also, the lighting apparatus 1A or 1B may be applied to an optical microscope that captures an image by using transmitted light or reflected light obtained by emitting illumination light L to an object to be observed, instead of the optical inspection apparatus 100A or 100B. Since the optical microscope may emit more uniform illumination light to the object to be observed while suppressing light loss, the object may be observed with a high resolution.

By way of summation and review, one or more embodiments may provide a lighting apparatus, an optical inspection apparatus, and an optical microscope that emit illumination light having small light loss over an illuminated region, no interference pattern incident on the target, and a uniform light intensity distribution over a predetermined ray angle distribution.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A lighting apparatus, comprising:
   a light source that emits light;
   an optical device that receives light from the light source and outputs light that is more uniformly intense over a predetermined ray angle distribution than light input thereto, the optical device being in a light path of the light source;
   a multi-reflection device that receives light from the optical device, reflects light multiple times, and emits multiple-reflected light, the multi-reflection device having a light incident surface that receives light from the optical device and a light emission surface that emits multiple-reflected light, the multi-reflection device being in a light path of the light source;
a light diffusion device that receives light emitted from the light emission surface of the multi-reflection device and diffuses light, the light diffusion device being in a light path of the light source; and
a light focusing optical system that receives light from the light diffusion device and focuses light onto an object to be illuminated,
wherein the optical device, the multi-reflection device, and the light diffusion device are axially aligned with an objective lens of the light focusing optical system.

2. The lighting apparatus as claimed in claim 1, wherein the optical device includes a plurality of concentric transmissive regions, adjacent transmissive regions having different transmittances.

3. The lighting apparatus as claimed in claim 2, wherein each of the transmissive regions have different transmittances from one another.

4. The lighting apparatus as claimed in claim 2, wherein the optical device includes:
a first transmissive region at a center;
a second transmissive region at an intermediate ring; and
a third transmissive region at an outermost ring,
wherein a third transmittance of the third transmissive region is higher than a second transmittance of the second transmissive region.

5. The lighting apparatus as claimed in claim 4, wherein the third transmittance is higher than a first transmittance of the first transmissive region.

6. The lighting apparatus as claimed in claim 2, wherein the optical device includes concentric transmissive regions having transmittances that continuously change in a radial direction.

7. The lighting apparatus as claimed in claim 6, wherein the transmissive regions include:
a central transmissive region formed at a center and having a central transmittance,
an outer transmissive region at outermost ring and has an outer transmittance, and
an intermediate transmissive region between the central transmissive region and the outer transmissive region and has an intermediate transmittance,
wherein the outer transmittance is higher than the intermediate transmittance.

8. The lighting apparatus as claimed in claim 1, wherein the optical device is between the light source and the multi-reflection device.

9. The lighting apparatus as claimed in claim 1, wherein the optical device is between the light diffusion device and an object to be illuminated.

10. The lighting apparatus as claimed in claim 1, wherein the optical device is before the multi-reflection device and further including another optical device after the multi-reflection device.

11. The lighting apparatus as claimed in claim 1, wherein the light source is a point light source,
wherein the lighting apparatus further includes a reflector that reflects the light emitted from the light source and focuses the reflected light onto the light incident surface of the multi-reflection device.

12. The lighting apparatus as claimed in claim 1, wherein the light source is a laser-produced plasma (LPP) light source or a laser-driven light source (LDLS).

13. The lighting apparatus as claimed in claim 1, wherein an area of a spot of the light focused on the light incident surface of the multi-reflection device is less than an area of the light incident surface of the multi-reflection device.

14. An optical inspection apparatus, comprising:
a light source that emits light;
an optical device that receives light from the light source and outputs light that is more uniformly intense over a predetermined ray angle distribution than light input thereto, the optical device being in a light path of the light source;
a multi-reflection device that receives light from the optical device, reflects light multiple times, and emits multiple-reflected light, the multi-reflection device having a light incident surface receiving the light and a light emission surface that emits multiple-reflected light, the multi-reflection device being in a light path of the light source;
a light diffusion device that receives light emitted from the light emission surface of the multi-reflection device and diffuses light, the light diffusion device being in a light path of the light source;
an image pickup apparatus; and
an optical path conversion device that receives light from the light diffusion device and transmits the light received from the light diffusion device to project onto an object to be inspected and reflects the light reflected from the object to be inspected the image pickup apparatus,
wherein the image pickup apparatus receives light reflected from the optical path conversion device.

15. A lighting apparatus, comprising:
a light source that emits light;
an optical device that receives light from the light source and outputs light that is more uniformly intense over a predetermined ray angle distribution than light input thereto, the optical device being in a light path of the light source;
an optical integrator having an input surface and an output surface, wherein light from the optical device is focused onto the input surface of the optical integrator, the optical integrator being in a light path of the light source and outputs integrated light;
a diffuser that receives light output from the optical integrator and diffuses light, the diffuser being in a light path of the light source; and
a light focusing optical system that receives light from the diffuser and focuses light onto an object to be illuminated,
wherein the optical device, the optical integrator, and the diffuser are axially aligned with an objective lens of the light focusing optical system.

16. The lighting apparatus as claimed in claim 15, wherein the optical device is designed in accordance with a ray angle distribution of the light from the light source and the predetermined ray angle distribution.

17. The lighting apparatus as claimed in claim 15, wherein the optical device is between the light source and the optical integrator.

18. The lighting apparatus as claimed in claim 15, wherein the optical device is after the diffuser.

19. The lighting apparatus as claimed in claim 15, wherein the predetermined ray angle distribution is annular.

* * * * *